United States Patent [19]
Phelps

[11] Patent Number: 5,427,718
[45] Date of Patent: Jun. 27, 1995

[54] UPPER AND LOWER CROSSFLOW FILM FILL STACK FOR A COOLING TOWER

[76] Inventor: Peter M. Phelps, 15 Buckeye Way, Kentfield, Calif. 94904

[21] Appl. No.: 199,513

[22] Filed: Feb. 22, 1994

[51] Int. Cl.⁶ .............................................. B01D 47/02
[52] U.S. Cl. .................... 261/23.1; 261/109; 261/112.1; 261/112.2; 261/DIG. 11
[58] Field of Search ............... 261/108, 112.2, 112.1, 261/DIG. 11, 109, 111, 23.1

[56] References Cited

U.S. PATENT DOCUMENTS

| | | | |
|---|---|---|---|
| 3,792,841 | 2/1974 | Munters | 261/112.2 |
| 3,917,764 | 11/1975 | Phelps . | |
| 3,947,532 | 3/1976 | Skold | 261/112.2 |
| 3,983,190 | 9/1976 | Morback | 261/DIG. 11 |
| 3,994,999 | 11/1976 | Phelps | 261/112.2 |
| 4,317,785 | 3/1982 | Dickey, Jr. et al. . | |
| 4,385,011 | 5/1983 | Skold . | |
| 4,592,877 | 6/1986 | Phelps | 261/109 |
| 4,747,980 | 5/1988 | Bakay et al. | 261/DIG. 11 |
| 4,826,636 | 5/1989 | Kinney, Jr. et al. | 261/DIG. 11 |
| 4,934,663 | 6/1990 | Phelps . | |
| 5,019,300 | 5/1991 | Davis et al. | 261/DIG. 11 |
| 5,023,022 | 6/1991 | Phelps . | |
| 5,312,464 | 5/1994 | Gray | 261/112.2 |
| 5,320,651 | 6/1994 | Drummond | 261/112.2 |

*Primary Examiner*—Khanh Nguyen
*Attorney, Agent, or Firm*—Flehr, Hohbach, Test, Albritton & Herbert

[57] ABSTRACT

A cooling tower (30) with a film fill assembly (37) includes a lower film fill stack (40) and an intermediate sloped or stepped film fill section (43). The lower stack (40) is disposed in a lower inboard corner (41) of the tower (30) proximal to an air outlet opening (35) and a collecting basin (36), and extends about 20% to 60% of the vertical height (L) of the film fill assembly (37). All film fill sections include vertical corrugated sheets (46) in composite forming an integral unit with adjacent sheets contacting each other and defining passages for gas and liquid. The film fill assembly (37) may include an upper vertically oriented film fill section (54) disposed in an upper outboard corner (44) of the cooling tower (30). A baffle assembly (73) collects and diverts descending water extending too far inwardly toward the tower plenum chamber (56) and past the lower film fill section (40).

20 Claims, 5 Drawing Sheets

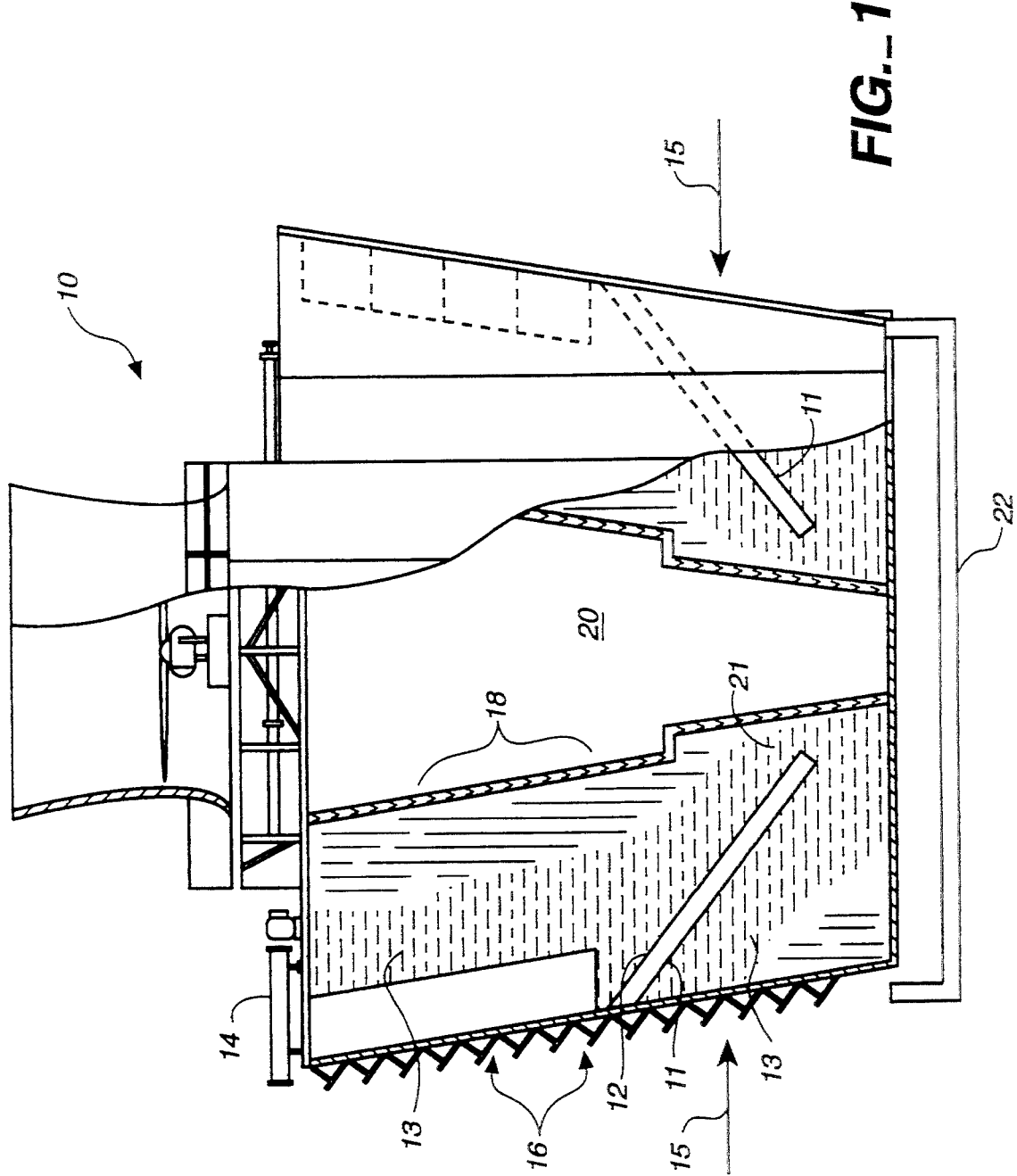
FIG._1

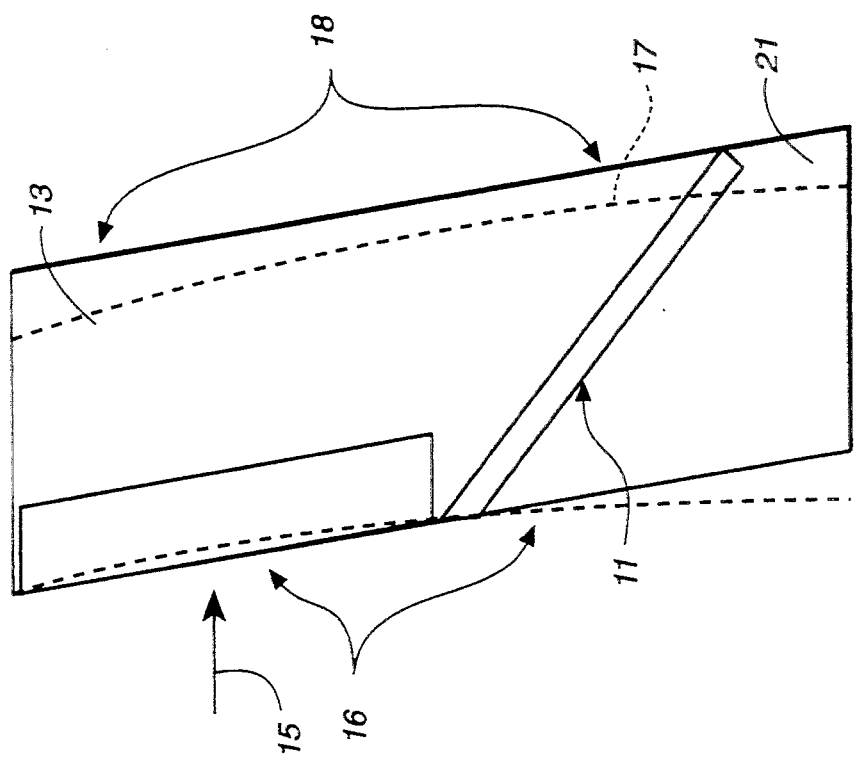
FIG._3
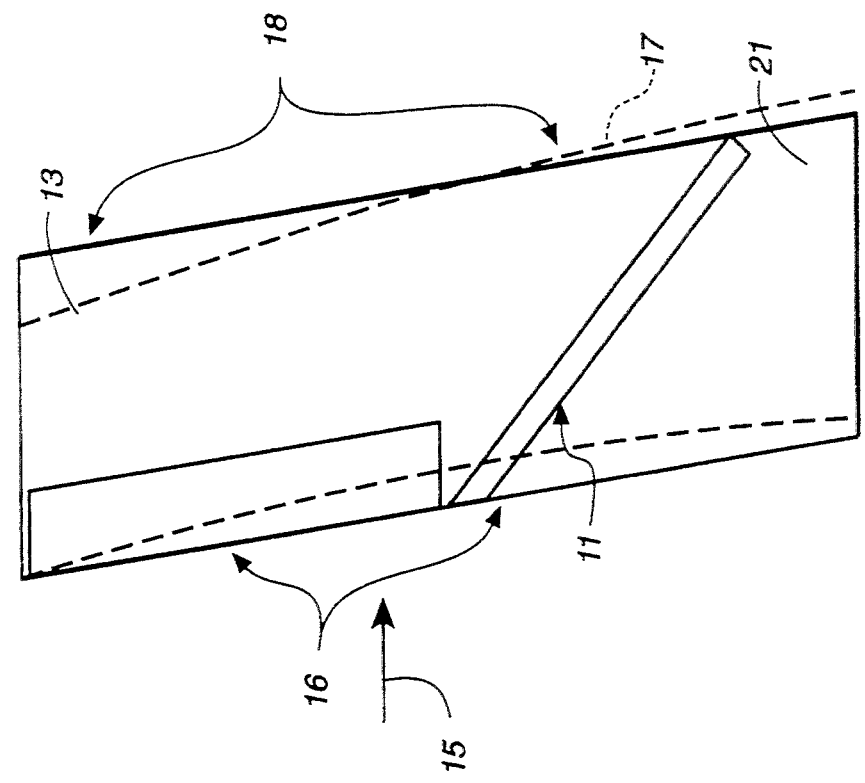
FIG._2

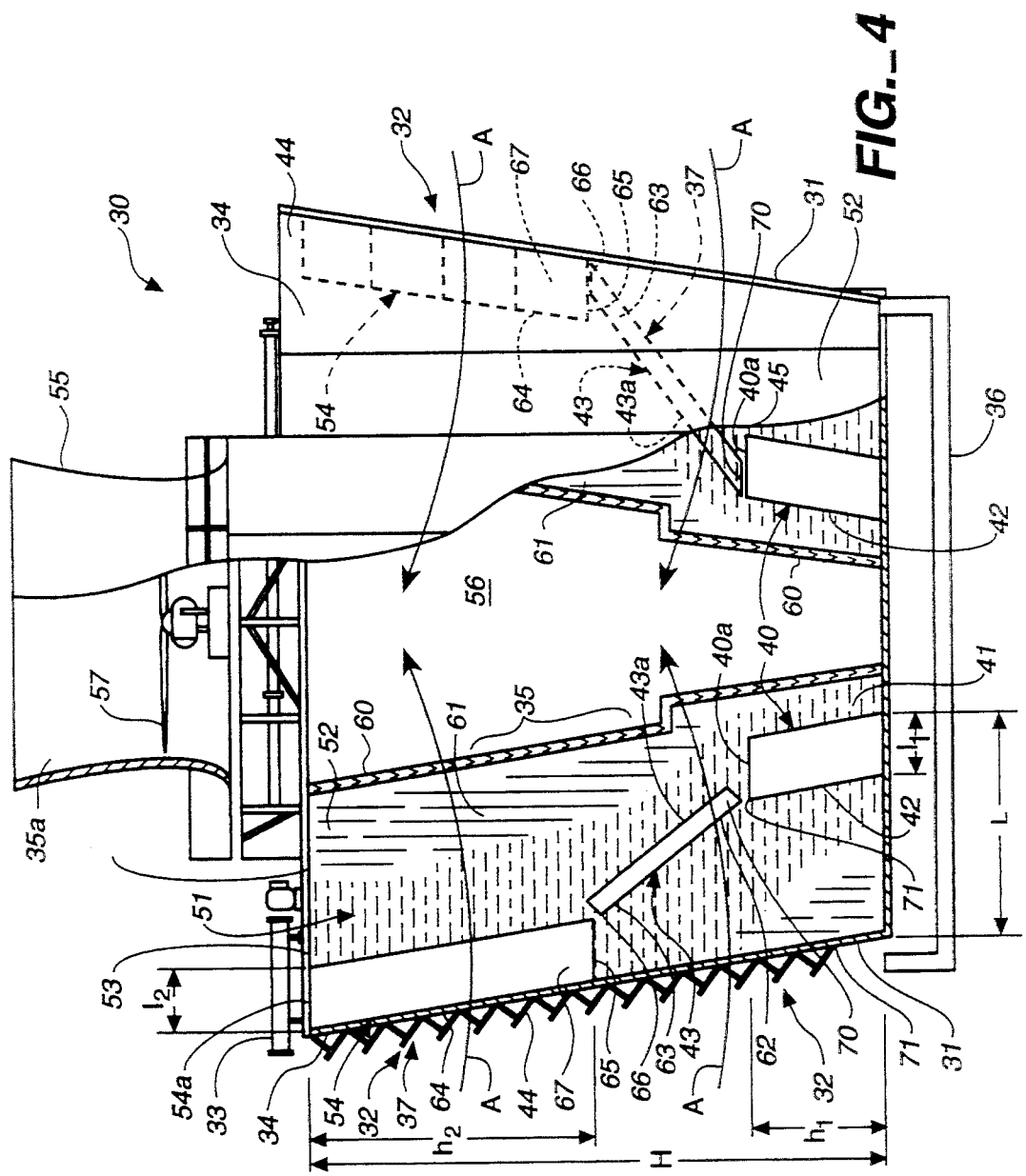
FIG._4

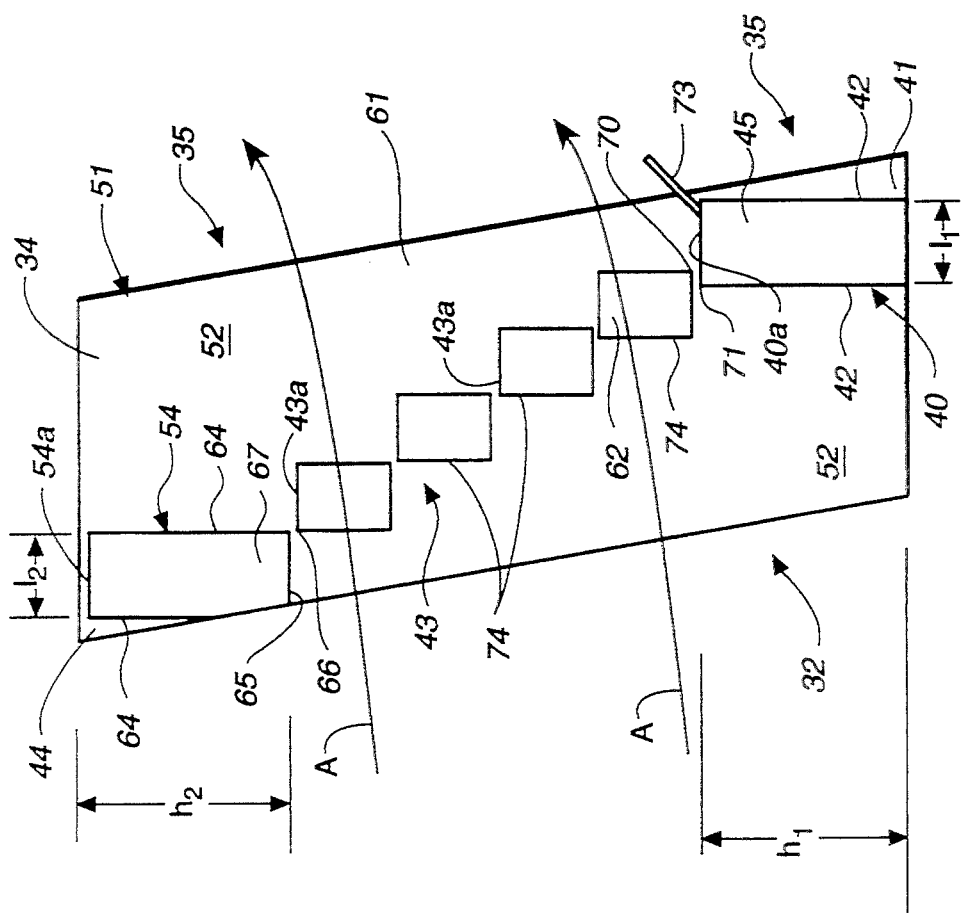
*FIG._6*
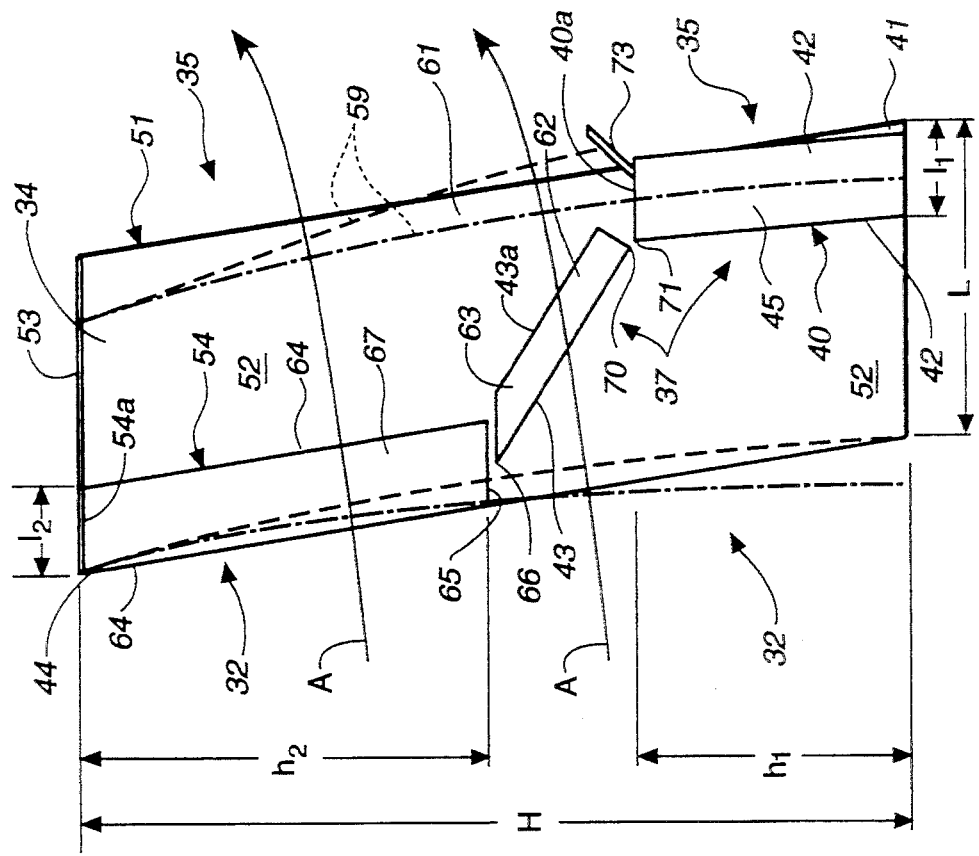
*FIG._5*

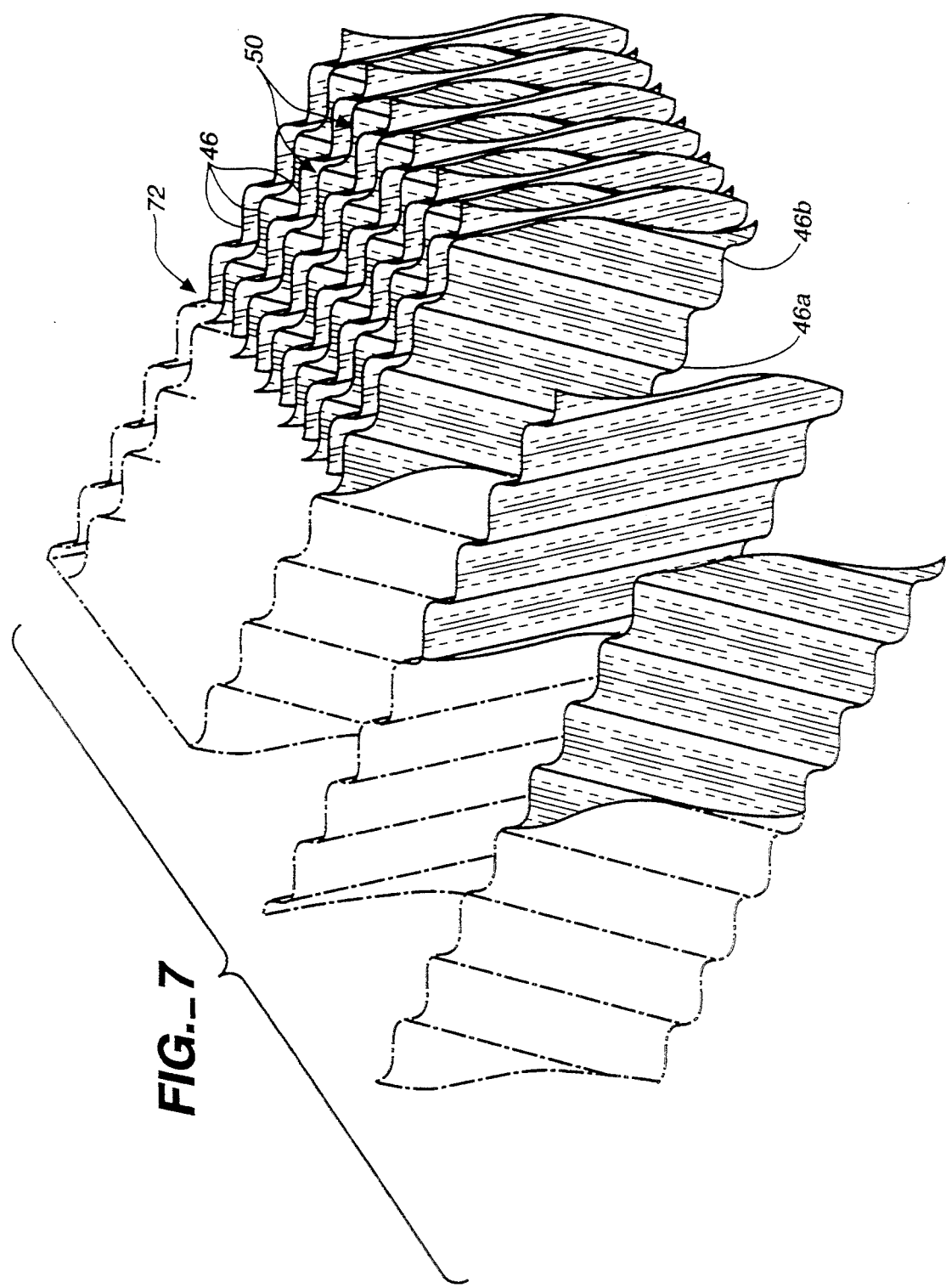
FIG._7

UPPER AND LOWER CROSSFLOW FILM FILL STACK FOR A COOLING TOWER

TECHNICAL FIELD

The present invention relates, generally, to film fill assemblies for cooling towers, and, more particularly, relates to upper and lower crossflow fill sections of film fill stacks for cooling towers.

BACKGROUND ART

Conventional crossflow cooling towers are presently in widespread use and generally comprise a relatively narrow vertical fill section with initially hot water being fed from an overhead source and the air being drawn therethrough from air inlets at the side of the tower. As the water descends in an even distribution along the vertical fill section, the cooling crossflow air currents intersect the descending water in a heat exchanging relation. Subsequently, the cooled water is collected in a water basin below, while the hot, moist air is discharged into the atmosphere.

In a crossflow cooling tower, since there is no necessity for the air to make radical changes of direction in the fill and the air inlet is spaced along the entire height of the fill, the overall air pressure losses are usually less than those of a conventional counterflow tower. Hence, air can be more easily passed through the tower, such as by powered fan.

Unfortunately, a crossflow cooling tower is inherently less efficient with respect to heat transfer than a counterflow tower based on a unit of fill. Another disadvantage of the crossflow cooling tower is that the water is loaded onto the top of the relatively thin crossflow fill. There is a maximum water load beyond which the water will not redistribute effectively because it will start gushing in a steady stream through the tower. When this maximum water load is exceeded in a crossflow tower of the film fill type, the water will not cling to the fill, leading to relatively poor heat transfer between the air and water. Also, resistance to the transversely flowing air is substantially increased requiring excessive fan power or a larger structure. This problem of water loading cannot be effectively overcome by widening the fill in the direction of air flow because there is a limiting factor on cooling efficiency relative to the thickness of the fill. A major factor in this limit is that the resistance to air flow for the longer air path through the fill disproportionately increases in comparison to the advantages to be attained by easing the above water load problems.

These crossflow cooling towers, as well as counter flow cooling towers, generally employ various varieties of splash-type fill sections consisting of elongated bars of a specific configuration for dispersing the descending released water. More recently, film-type fill sections have been developed which have proven substantially more efficient than splash fill sections. These typically corrugated film fills generally consist of a series of thin, opposed sheets formed of synthetic resin materials in which the water passes along the sheets in a "film". Although the film fill sections may be as much as five times as efficient as splash fill sections, their substantial cost differential and higher resistance to air flow has prevented total supplanting of the latter.

A hybrid approach is disclosed in U.S. Pat. No. 3,917,764 which combines the advantages of the counterflow and crossflow cooling towers, as well as combining the fill assemblies with both splash fill sections and film fill sections. Specifically, as shown in FIG. 1, that patent describes a cooling tower 10 with a sloped film fill section 11 having an incline principal plane 12 formed of a number of sheets mounted for the passage of gas and liquid. This sloping film fill section spreads the liquid gravitating onto its upper surface into a thinner, more uniform film on the lower surface. Splash-type fill 13 is disposed inboard and/or outboard of the sloping fill which when combined with corrugated and other types of film fill result in a fairly efficient cooling tower arrangement with relatively low air pressure drop.

Another combined fill application is disclosed in U.S. Pat. No. 4,317,785 to Dickey, Jr. et al. That patent describes a cooling tower with a number of film fill box-like sections arranged in a stair-step configuration progressing with the highest section at the outboard end of the fill area and the lowest section at the inboard end. The remainder of the tower available for water distribution is filled with splash fill. Air travels horizontally through the film fill boxes.

Crossflow fill sections and the framing to accommodate these sections (FIGS. 1-3) are normally standardized designs dimensioned in a cross-sectional parallelogram configuration which primarily depend upon the size of the cooling tower. This cross-sectional configuration basically conforms to the drift angle or trajectory of the water as it is released from the overhead water source 14 and is influenced by air (illustrated by arrow 15) flowing through the gas inlet opening horizontally at right angles to the falling water. Thus, this drift angle is primarily a function of the velocity of the entering air as it impinges on the falling water.

Contact of the released water with the film fill is very important considering the film fill has at least five times the cooling capability of the surrounding splash fill. Accordingly, any loss of film fill contact between water and air is critical, particularly at that low point in the tower where water must be at its coolest and if that portion of the water leaves the tower without any further chance to contact film fill.

In comparison, in cooling towers containing either all splash fill or all film fill, enough fill air travel can be provided to accommodate any variations in drift angle caused by varying cross air velocities so that all the released water will still contact the fill as it falls. In combined splash fill and sloped ('764 patent) or stepped ('785 patent) film fill cooling towers, however, the angle of slope and the resultant lower point of termination of the sloped film fill must be selected where the highest probability of impingement with the normal trajectory of water will occur. Hence, it is normally a compromise to attempt to establish a proper angle of water drift taking into account dimensions of the tower and the average cross air velocities.

The above-mentioned combined film fill/splash fill cooling tower arrangements perform exceptionally well when the drift angle falls within the design specifications. However, due to the adverse influence of the cross air flow on the descending released water, especially in fill sections of greater height, the drift angle often falls below or surpasses the designed drift angle. For example, as shown in FIG. 3, if the drift angle is less than design, the drift angle will be steeper and the lower water (illustrated by broken lines 17) will contact the film fill or splash fill outboard of the designed film fill section such that the lowermost cross flow air will not properly contact the water as it passes through the lowermost film fill. In contrast, if the cross-flow air velocity is higher than design, the lower water 17 may be carried more inwardly toward a tower plenum chamber 20 (FIG. 2) past the lowermost inward corner 21 of sloped film 11 (FIGS. 1 and 2). In both events, the overall cooling efficiency is reduced. Cross flow air velocity variations can be caused by several situations. Should the air flow be stopped or substantially slowed, such as in mechanical draft cooling towers to conserve fan power in the winter, the released water tends to fall more vertically having a drift angle smaller than the compromised design parameters. Further, wind blowing into one side of a tower can result in the descending water on the upwind side being carried too far inward toward the tower plenum chamber 20; while on the downwind side of the tower, the released water will not be carried far enough inward. In natural draft designs, where the air flow is induced by the chimney draft of a high discharge stack, winter drafts are higher than those of summer whereby the release water may be carried at a greater drift angle than that of the film fill section.

Since there is usually a limited amount of film fill in these combined splash fill/film fill cooling towers, for the reasons mentioned above, any loss of film fill contact between the water and the air is critical. This is particularly true at that low point in the cooling tower since this is the last region of heat exchange where the air and water can come into contact together at the film fill medium before that water falls into collecting basin 22.

Another problem associated with sloped film fill sections is that when they are too steeply slanted and too narrow, particularly if the cross flow air velocity is high, the fill tends to capture the water within the film fill so that the film of water may have difficultly running off a water discharge face or bottom edge of that film fill component. Consequently, the water retention tends to overload that fill and adversely affect cooling performance, as well as disturb the normal flow pattern of the water leaving the film fill, hence, adversely affecting the heat exchanging capabilities. The same thing can happen in a stepped film fill design where the steps must be overlapped due to the steep angle, and the overlapping creates a continuous path for the aforementioned retained water.

In an attempt to address this problem, U.S. Pat. No. 4,385,011 to Munters provides a film fill which more efficiently discharges the water from the face or bottom edge of the sloped film fill component. This solution, however, does not prevent the water retention and buildup occurring within the film fill.

By reducing the angle of slope of the film fill unit, the inner and lower film fill surfaces are permitted to more efficiently drain which substantially eliminates the above-mentioned water retention problem. This relatively flat film fill slope, however, may not match the framing of a standard tower, or may require special wider tower framing which increases the distance of the cross flow air flowing horizontally through the film fill section between gas inlet 16 and a gas outlet 18. Due to space and design limitations of the overall width of the fill unit, this configuration may preclude the lower inboard corner of a flatter film fill section from terminating at the desired lower inner corner of the overall tower fill section.

DISCLOSURE OF INVENTION

Accordingly, it is an object of the present invention to provide a lower crossflow film fill stack for a cooling tower which enhances the performance of a sloped or stepped film fill cooling tower regardless of cross flow air velocity variations.

Another object of the present invention is to provide an upper and lower crossflow film fill stack for a cooling tower which cooperates with an intermediate sloped or stepped film fill to accommodate a wider range of drift angles of water descending from a liquid supply.

Yet another object of the present invention is to provide a combined splash fill/film fill cooling tower which is more operably efficient.

Still another object of the present invention is to provide an upper and lower crossflow film fill stack for a cooling tower which reduces water retention within the sloped or stepped film fill section for overly steep film fill.

It is a further object of the present invention to provide an upper and lower crossflow film fill stack for a cooling tower which is durable, compact, easy to maintain, has a minimum number of components, and is economical to manufacture.

In accordance with the foregoing objects, one embodiment of the present invention provides a cooling tower for contacting liquid and gas comprising at least one upright sidewall having a gas inlet opening, and a liquid supply for supplying gravitating liquid to an upper portion of the tower. The tower further includes a gas outlet opening, a water collecting basin, and a film fill assembly. The film fill assembly includes a lower film fill section disposed in a lower inboard corner of the tower proximal to the outlet opening and the collecting basin. The lower film fill section is defined by generally upright sides extending about 20% to 60% of the overall vertical height of the fill assembly. The film fill assembly further includes a sloping film fill section having a principal plane inclined at an angle of about 20° to 70° to the vertical. The sloping film fill section extends from a location proximal an upper outboard corner of the tower proximal to the gas inlet opening and liquid supply means to a location proximal a portion of the lower film fill section. Substantially all of the gas flowing from the gas inlet opening to the gas outlet opening flows through at least one of the lower and sloping film fill sections. The lower and sloping film fill sections further comprising a plurality of sheets cooperating to form the sections in integral units with adjacent sheets and defining passages for gas and liquid. The sheets are aligned to define a gas path extending generally from the gas inlet opening toward the gas outlet opening and are substantially vertically disposed to provide an essentially vertical path to liquid gravitating from the liquid supply.

In an alternative embodiment, the film fill assembly may also include an upper film fill section disposed in the upper outboard corner of the tower proximal to the gas inlet opening and the liquid supply. The upper film fill section is defined by generally upright sides and opposing top and bottom surfaces.

Further, rather than an intermediate sloping film fill section, the film fill assembly may include a stairstepped series of intermediate film fill sections extending from a location proximal the inboard lower corner of the upper film fill section to a location proximal to the upper outboard corner of the lower film fill section. Each of the intermediate film fill sections being defined by generally upright sides and a generally opposing top and bottom surfaces.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a schematic side elevation view of a prior art crossflow cooling tower employing a sloped film fill assembly.

FIG. 2 is an a enlarged, schematic, side elevation view of the prior art sloped film fill assembly of FIG. 1 and illustrating descending water having a trajectory angle greater than the designed drift angle.

FIG. 3 is an a enlarged, schematic, side elevation view of the prior art sloped film fill assembly of FIG. 1 and illustrating the descending water having a trajectory angle less than the designed drift angle.

FIG. 4 is a side elevation view, partially broken away, of a crossflow cooling tower including a film fill assembly having an upper and lower film fill stack constructed in accordance with the present invention.

FIG. 5 is an enlarged, schematic, side elevation view of the upper and lower film fill stacks of FIG. 4 and illustrating the descending water having a trajectory angle greater than (broken lines) or less than (phantom lines) the designed drift angle.

FIG. 6 is an enlarged, schematic, side elevation view of the upper and lower film fill stacks in combination with a stair-stepped series of intermediate film fill sections.

FIG. 7 is an enlarged, fragmentary, schematic, top perspective view of corrugated film fill typically employed in the present invention.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

In general, the present invention concerns the utilization of sloped film fill, and upper and lower film fill stacks or sections positioned at the ends of the sloped film fill in a gas-liquid contact tower. Although useful in gas stripping towers and the like, such towers will be designated "cooling towers" herein as they are most commonly utilized for cooling liquid, such as water, by inducing the surrounding gas, air, into the tower to contact and thereby cool the water. A number of different film fill types may be employed in accordance with the invention. In addition, auxiliary splash type fill may be employed.

Attention is now directed to FIG. 4 where a cooling tower, generally designated 30, is illustrated for contacting liquid and gas. The cooling tower 30 comprises at least one upright sidewall 31 having a gas inlet opening 32, and a liquid supply source 33 for supplying gravitating liquid (not shown) to an upper portion 34 of the tower. Further, tower 30 includes a gas outlet opening 35, a water collecting basin 36, and a film fill assembly 37. The fill apparatus 51 includes a film fill assembly 37 having a lower film fill stack or section, generally designated 40, disposed in a lower inboard corner 41 of tower 30 proximal to outlet opening 35 and collecting basin 36. Lower film fill section 40 is defined by generally upright sides 42 extending about 20% to 60% of the vertical height (H) of film fill assembly 37, and top surface 40a and an opposing bottom surface. Fill assembly 37 further includes a sloping film fill section, generally designated 43, having a principal plane inclined at an angle of about 20° to 70° to the vertical. The sloping film fill section extends from a location proximal an upper outboard corner 44 of the tower proximal to gas inlet opening 32 and liquid supply source 33 to a location proximal an upper portion 45 of lower film fill section 40 so that substantially all of the gas flowing from gas inlet opening 32 to gas outlet opening 35 flows through at least one of the lower and the sloping film fill sections. Each of these film fill sections includes a plurality of sheets 46 (FIG. 7) cooperating to form the sections in integral units with adjacent sheets and defining passages 50 for gas and liquid. The sheets 46 are substantially aligned to define a gas path (A) extending generally from gas inlet opening 32 toward gas outlet opening 35 and being substantially vertically disposed to provide an essentially vertical path to liquid gravitating from liquid supply source 33.

It will be appreciated that the terms "proximate" and "proximal" will refer to the continuity between two structures which are not necessarily, but can be, joined together. Hence, a small air gap between the two structures is permitted as long as the small gap only allows an inconsequential amount of air to flow therethrough. Further, the proximal locations of two opposing edges of two film fill sections will be understood to mean the continuity therebetween anywhere along those opposing edges.

Briefly, water collecting basin 36 is disposed below the fill apparatus 51 (i.e., the film fill assembly 37 and the splash fill assembly 52) in a position to receive liquid gravitating therefrom (FIG. 4). An open top perforated distribution pan or tray 53 is positioned directly above fill assembly 37 to permit water to gravitate through the apertures, perforations or nozzles (not shown) onto the film fill assembly upper surfaces 54a, 43a, and 40a, and onto the splash fill assembly upper surface 52a. A suitable pumping structure (not shown) is operably coupled to basin 36 for removing deposited liquid therein and for delivering the water to equipment requiring the same for cooling and for returning the water to trays 53. If desired, a portion of the liquid removed may be recycled to trays 53 for further cooling prior to delivery to the equipment.

A vertical stack 55 is secured to the top face of tower 30 and extends upwardly from a central plenum chamber 56 to define an upper outlet opening 35a for gas (air) exiting therefrom. A fan 57 positioned within stack 55, coupled to a suitable source of power for actuation, causes currents of air to be drawn through film fill assembly 37 generally along path (A) and forced upwardly through chamber 56 into stack 55 for discharge through the upper portion of the latter. Alternatively, the cooling tower may be operated by natural induction by the elimination of fan 57 in which case air would be induced to flow through the tower by means of natural convection of the warm exhaust air rising through chamber 56 and an extended stack 55.

Further, a drift eliminator wall 60 is disposed across the path of air exiting from the cooling section and in a generally upright position to prevent gravitating water from being carried as a spray into the plenum chamber. Wall 60 may be of any conventional type such as a series of spaced inclined baffles to permit the free flow of air therethrough but to prevent significant quantities of liquid droplets to escape into the plenum chamber 56.

Referring now to FIGS. 4 and 5, the present invention positions a more highly water loaded crossflow film fill section 40 at a lower inner corner 41 of the tower which accommodates descending water which otherwise would not contact any effective portion of film fill assembly 37. Lower film fill section 40 is more vertically oriented and extends upward from collecting basin 36 towards an inner side 61 of the splash fill assembly 52 where the descending water normally would tend to cease effective contact with the film fill assembly. That is where the path of descending water 59 (shown in phantom and broken lines in FIG. 5) would either fall short or be carried past, by the crossflow air, the film fill assembly as above-mentioned. Hence, in the prior art arrangements, this water would normally be dispersed about the lower inner corner region of the intermediate sloped film fill section 43. Instead it impinges the generally horizontal top surface 40a of lower film fill section 40.

Further, since the vertical path of the descending water contacting the lower film fill section is generally substantially longer than that contacting the sloped film fill section, the heat-exchange capability is also substantially greater. Such an inner crossflow film fill section will not only provide a very effective contact heat exchanging medium between the crossflow air and descending water, but will also tend to maintain the retainment of water within the film fill for a more effective heat exchange due to normal capillary action between the film fill surface and the water. In certain types of film fill, although the film fill section will retain the water as noted, if the water loading is too low, this water may channel in uneven streams through the film fill, rather than maintaining a well balanced distribution over all film surfaces. Hence, as will be discussed in more detail below, it is desirable to have a higher than normal water loading onto the lower film fill section that would otherwise fall uniformly over the sloped fill section 43 of the prior art film fill apparatus.

In accordance with the present invention, the height ($h_1$) of lower film fill section 40 in a cooling tower employing a sloped or stepped film fill section is between about 20% to about 60% of the overall height (H) of fill apparatus 51 (FIG. 4). The most effective lower stack height ($h_1$) is dependent to some extent on the geometry of the intermediate film fill section (i.e., sloped or stepped). Generally, in cooling towers with an intermediate sloped film fill section, the preferred height ($h_1$) of lower film fill section 40 is about 25% of the overall height (H) of the fill apparatus 51 (FIG. 5); while in cooling towers with a stair-stepped series 74 of intermediate film fill sections 43, the minimum preferred height ($h_1$) is about twice the average height of the remaining steps 74 above it (FIG. 6).

More specifically, however, the desired lower film fill height ($h_1$) at which the sloped film fill lower portion 62 terminates and the lower film fill upper portion 45 is introduced is a function of how much of the lightly loaded water is to be collected and diverted onto the lower film fill stack 40. If the height of this conversion point is too tall or too far up the sloped film fill, the optimum design water load collected may be too high for good crossflow film fill cooling. Consequently, if the conversion point is too low or too far down the sloped film fill, as previously noted, the collected water load onto the lower crossflow film fill stack 40 may be too low to result in proper overall cooling from the entire tower. When the collected water flow is averaged onto the crossflow section at a proper concentration, however, the crossflow fill section will then operate at a level of cooling which optimized the weighted average of cooled water and heated air from the inner lower film fill.

The depth or length ($l_1$) of the lower film fill section 40, extending between the gas inlet opening 32 and the gas outlet opening 35, depends upon the effect on cross air flow of the resistance of the stack. This length ($l_1$) generally extends about 10% to 40% of the overall horizontal length (L) of the film fill assembly 37 between the gas inlet opening 32 and the gas outlet opening 35. A depth greater than 40% of the overall horizontal length (L) will increase the drag of air flow and high air moving power, and/or greater unbalance of air flow through the stack or stacks and through the rest of the tower. In the preferred embodiment, in both the sloped and stepped film fill sections, the lower film fill length ($l_1$) is about $\frac{1}{4}$ of the overall length (L).

FIGS. 4 and 5 further illustrate that film fill assembly 37 of the present invention preferably, but alternatively, includes an upper generally vertically oriented film fill section, designated 54, as well. Upper film fill section 54 is disposed in an upper outboard corner 44 of cooling tower 30 proximal an upper portion 63 of sloped film fill section 43, and is defined by generally upright sides 64 and a generally horizontal top surface and bottom surface 65. FIG. 5 illustrates that a lower portion 67 of upper film fill section 54 terminates proximal the upper portion 63 of sloped film fill section 43. In the preferred form, an upper outboard corner 66 of sloped film fill section 43 is oppositely positioned to bottom surface 65 of upper film fill section 54. It will be appreciated that the structural configuration or makeup of the upper film fill section is substantially similar to the above-discussed fill sections of the film fill assembly (i.e., a plurality of sheets 46).

Accordingly, combining the upper film fill stack or section 54 with the sloped film fill section 43 and the lower film fill stack 40 presents an opportunity to reduce the angle of inclination of the sloped film fill section (FIG. 5). Because the sloped film fill section 43 terminates anywhere along the edge proximate both the bottom surface 65 of upper film fill section 54 and the top surface 40a of lower film fill section 40, greater flexibility is permitted in choosing the angle of inclination (FIGS. 4 (right and left side) and 5). As mentioned, a smaller inclination reduces water retention and buildup occurring within the sloped film fill section 43, as well as capillary adhesion of the water to the lower edge thereof; a problem caused by too steep an inclination the sloped film fill.

Preferably, the inboard lower corner 70 of sloped film fill section 43 is positioned proximate and opposing an upper outboard corner 71 of the lower film fill section 40. By positioning the upper portion 63 of the sloped film fill section 43 proximal the lower portion 67 of upper film fill section 54, and by positioning the lower portion 62 of sloped film fill section 43 proximal the upper portion 45 lower film fill section 40, flow continuity between the fill sections is maintained. It will be appreciated that the height ($h_2$) and length ($l_2$) specifications of upper film fill section are substantially similar to those of the lower film fill section (i.e., about 20% to 60% of H, and 10% to 40% of L, respectively). In some instances, it is desirable to maintain a purposely narrow overall air path length (L) from gas inlet opening 32 and gas outlet opening 35 to assure substantially equivalent heights (($h_1$) and ($h_2$)). This results in reduced costs of the overall cooling tower structure. In other situations, however, particularly when upgrading the efficiency and performance of existing cooling towers, the upper and lower film fill section heights (($h_1$) and ($h_2$)) may differ relative to one another due to the location of the region where the drift angle of the water generally ceases to be in contact with the inner side 61 of splash fill assembly 52 of the tower fill apparatus 51. It will be appreciated, however, that the dimensions, particularly the height, of the film stacks are strategically determined so as to optimize performance from the combination of stack or stacks with a sloped or stepped film fill section.

Preferably, both top surface 40a of lower film fill section 40 and bottom surface 65 of upper film fill section 54 are generally horizontal. Accordingly, the cross-sectional dimension is generally rectangular or parallelogram-shaped. The cross-sections, however, may be trapezoid or trapezium-shaped without departing from the true spirit and nature of the present invention.

Referring to FIG. 7, film fill 72 is preferably of the corrugated-type which is extremely well suited for use in the film fill assembly 37 in accordance with the present invention. Film fill 72 comprises a plurality of corrugated sheets 46 with ridges 46a and grooves 46b disposed so that ridges of alternate sheets cross and abut against the ridges disposed between alternate sheets to form channels therebetween. The channels 50 have a constantly varying width from zero at the contact points between the sheets to a maximum of twice the distance between the ridges and grooves of individual sheets. In the illustrated embodiment, the corrugations of the type illustrated in film fill 72 extend throughout sloped fill section 43 with the sheets substantially vertically disposed to provide an essentially vertical path to liquid gravitating from liquid supply source 33 (FIG. 5). The sheets preferably are substantially parallel to the direction of air flow along path (A) without unnecessary redirection of the air to avoid consequent increased fan power requirements.

Sheets 46 are preferably formed of a plastic material such as polyvinylchloride. The sheets are preferably adhered to each other at the points of contact by means of solvent gluing at the interfaces. In this technique, solvent is applied at the contact points to form an adhesive with the plastic. The contact points adhere on solidification. In another embodiment the sheets are not adhered. Instead, they are hung and contact each other through spacer elements integral with the sheets.

The angle that the corrugations of sheets 46 assume with respect to sloped film fill section 43 may be varied substantially in accordance with transfer requirements of the particular tower. In one preferred embodiment, a major portion of the corrugations are an inclination of 0° to 45° to the horizontal. Horizontally flowing air along the path of arrow A has a relatively easy path through fill assembly 37 as it is not required to abruptly change its direction. This leads to low fan power requirements. Simultaneously, the same fill provides a relatively tortuous path for the gravitating liquid to increase the redistribution and spreading of the liquid onto the fill surface. This principle of operation of sloped film fill section 43 is described in U.S. Pat. No. 3,917,764, incorporated herein by reference.

In accordance with the present invention, a baffle assembly, generally designated 73 (FIG. 5), may be mounted atop horizontal top surface 40a of the lower film fill stack which extends longitudinally therealong. Baffle assembly 73 is generally planar and is formed to collect and divert descending water, extending too far inwardly toward plenum chamber 56 past the lower film fill section 40 in extreme conditions, onto the top surface 40a thereof for an increased water load. A distribution flume (not shown) positioned above the lower film fill may be employed to evenly distribute the collected water onto the fill through suitable orifices.

It will be understood that baffle assembly 73 is of particular advantage when lower film fill section 40 is positioned where the crossflow air can have a significant effect by blowing into the side of cooling tower 30. In fairly windy conditions, the water may be diverted too far inward toward plenum chamber 56 substantially past the normal drift angle. Further, it may be advantageous to include more than one diverter baffle assembly 73 situated atop one another to divert misdirected descending water back onto the lower film fill section.

The present invention may also include more heavily loading the lower film fill section with descending water to take advantage of the increased cooling capability and efficiency of the film fill assembly. This purposely takes advantage of the fact that there is more fill surface in the path of the falling water through the lower film fill stack than is the case for the water path through the sloped film fill section. Even though the cross flow heat transfer is less effective through the inner film fill stack than through a slanted counterflow film fill section, the net effect can often still favor there being a heavier water load placed over the inner film fill stack due to its greater area of film surface in the path of the water.

Accordingly, by enlarging or providing a greater number of spaced distribution nozzles (not shown) in water tray 53 at the section substantially providing water to lower film fill section 40, an increased water load can be maintained. Hence, more hot water is exposed to the increased cooling capabilities of the lower fill section.

Similarly, although for a different reason, as discussed in U.S. Pat. No. 5,023,022 and incorporated herein by reference, the water distribution above upper film fill section 54 may be more heavily loaded using the same technique. This presents a feature whereby high capability film fill is concentrated in an upper outer area of the overall fill section so that the hottest water comes into contact with the coolest inlet air, a condition particularly suitable for crossflow cooling. Further, it will be understood that by more heavily loading the upper and lower film fill sections with water, the sloped internal film fill can thus be more lightly loaded, which enhances its better counterflow cooling characteristics.

In an alternative embodiment, the present invention may also be applied to a stepped intermediate film fill section 43 such as that disclosed in U.S. Pat. No.

4,317,785 to Dickey, Jr. et al. While this reference suggests that the cubes may be varied in height, no specific reasons for this configuration have been submitted. Moreover, the individual cubes are generally referred to as being substantially equal in height.

Accordingly, as best viewed in FIG. 6, film fill section 43 is provided by a series of steps 74 preferably positioned in a corner-to-corner declining position. Similarly, a lower film fill section 40 is preferably disposed such that the upper outboard corner 71 thereof is positioned proximal to and in opposed relationship to a lower inboard corner 70' of the lowermost step 74' of the stepped series. It will be understood, however, that the inboard corner 70' of lowermost step 74' could extend over the top surface 40a of lower film fill section 40 without departing from the true spirit and nature of the present invention.

As mentioned above, the upper film fill height ($h_2$) and the lower film fill height ($h_1$) are both preferably at least twice the average height of the steps 74 of the intermediate stepped film fill section 43. Hence, the top surface 40a of lower film fill section 40 can be optimally positioned along the stepped series such that width and the depth of each step can be optimally sized and positioned.

What is claimed is:

1. A cooling tower for contacting liquid and gas comprising:
   at least one upright sidewall having a gas inlet opening;
   liquid supply means for supplying gravitating liquid to an upper portion of the tower;
   a gas outlet opening;
   a water collecting basin; and
   a fill apparatus having a film fill assembly including:
   a lower film fill section disposed in a lower inboard corner of the tower proximal to said outlet opening and said collecting basin, said lower film fill section being defined by generally upright sides extending about 20% to 60% of the vertical height of said fill apparatus; and
   a sloping film fill section having a principal plane inclined at an angle of about 20° to 70° to the vertical, and extending from a location proximal an upper outboard corner of the tower proximal to said gas inlet opening and liquid supply means to a location proximal an upper portion of said lower film fill section so that substantially all of the gas flowing from said gas inlet opening to said gas outlet opening flows through at least one of said lower and sloping film fill sections;
   said lower and sloping film fill sections comprising a plurality of sheets cooperating to form said sections in integral units with adjacent sheets and defining passages for gas and liquid, said sheets being substantially aligned to define a gas path extending generally from said gas inlet opening toward said gas outlet opening and being substantially vertically disposed to provide an essentially vertical path to liquid gravitating from said liquid supply means.

2. The cooling tower according to claim 1 wherein, said lower film fill upper portion comprises an upper surface thereof, and
said adjacent sheets substantially contacting one another.

3. The cooling tower according to claim 2 wherein, said upper surface is the upper outboard corner of said lower film fill section.

4. The cooling tower according to claim 2 wherein, said fill assembly further includes an upper film fill section disposed proximal an upper portion of said sloping film fill section, said upper film fill section being defined by generally upright sides, and further comprising a plurality of sheets cooperating to form an integral unit with adjacent sheets and defining passages for gas and liquid, said sheets being substantially aligned to define a gas path extending generally from said gas inlet opening toward said gas outlet opening and being substantially vertically disposed to provide an essentially vertical path to liquid gravitating from said liquid supply means.

5. The cooling tower according to claim 4 wherein, said sloping film fill upper portion terminates at a lower portion of said upper film fill section.

6. The cooling tower according to claim 4 wherein, an upper outboard corner of said sloping film fill section terminates at a lower outboard corner of said upper film fill section.

7. The cooling tower according to claim 4 wherein, said upper film fill section extends about 10% to 40% of the horizontal length of said film fill assembly.

8. The cooling tower according to claim 7 wherein, said fill apparatus further includes a splash-type fill disposed between said film fill assembly and said liquid supply means to provide increased liquid distribution onto the film fill assembly.

9. The cooling tower according to claim 8 wherein, said generally upright sides of said lower film fill section comprise about 25% of the vertical height of said fill apparatus, and
each of said lower and said upper film fill section extends about ¼ of the horizontal length of said film fill assembly.

10. The cooling tower according to claim 8 wherein, said liquid supply means more heavily distributes said liquid over said lower film fill section.

11. The cooling tower according to claim 10 wherein, said liquid supply means more heavily distributes said liquid over said upper film fill section.

12. The cooling tower according to claim 1 wherein, an inboard side of said lower film fill section is spaced outwardly an outset distance from said gas outlet opening, and
said cooling tower further comprising a baffle projecting from an upper surface of said lower film fill section in an upwardly sloping direction across a portion of said gas inlet opening and toward said gas outlet opening a sufficient distance so that water gravitating from the inboard side of said liquid supply means can flow along said baffle to an upper surface of said lower film fill section.

13. A cooling tower for contacting liquid and gas comprising:
   at least one upright sidewall having a gas inlet opening;
   liquid supply means for supplying gravitating liquid to an upper portion of the tower;
   a gas outlet opening;
   a water collecting basin; and
   a fill apparatus having a film fill assembly including:
   an upper film fill section disposed in an upper outboard corner of the tower proximal to said gas inlet opening and liquid supply means, said upper film fill section being defined by generally upright sides and opposing top and bottom surfaces;

a lower film fill section disposed in a lower inboard corner of the tower proximal to said outlet opening and said collecting basin, said lower film fill section being defined by generally upright sides and opposing top and bottom surfaces; and a sloping film fill section having a principal plane inclined at an angle of about 20° to 70° to the vertical, and extending from a location proximal a portion of said upper film fill section to a location proximal a portion of said lower film fill section so that substantially all of the gas flowing from said gas inlet opening to said gas outlet opening flows through at least one of said upper, lower and sloping film fill sections;

said upper, lower and sloping film fill sections comprising a plurality of sheets cooperating to form said sections in integral units with adjacent sheets and defining passages for gas and liquid, said sheets being substantially aligned to define a gas path extending generally from said gas inlet opening toward said gas outlet opening and being substantially vertically disposed to provide an essentially vertical path to liquid gravitating from said liquid supply means.

14. The cooling tower according to claim 13 wherein, said lower film fill portion comprises said top surface thereof.

15. The cooling tower according to claim 13 wherein, said lower film fill portion is an upper outboard corner of said lower film fill section.

16. The cooling tower according to claim 13 wherein, said lower film fill upper portion comprises an upper inboard corner thereof, and said upper film fill lower portion comprises a lower outboard corner thereof.

17. The cooling tower according to claim 13 wherein, said generally upright sides of said lower film fill section extend about 20% to 60% of the vertical height of said fill apparatus.

18. The cooling tower according to claim 13 wherein, each said top and bottom surfaces of said lower and said upper film fill section extends about 10% to 40% of the horizontal length of said film fill assembly.

19. The cooling tower according to claim 13 wherein, said fill apparatus further includes a splash-type fill disposed between said film fill assembly and said liquid supply means to provide increased liquid distribution onto the film fill assembly.

20. The cooling tower according to claim 13 wherein, an inboard side of said lower film fill section is spaced outwardly an outset distance from said gas outlet opening, and said cooling tower further comprising a baffle projecting from said top surface of said lower film fill section in an upwardly sloping direction across a portion of said gas inlet opening and toward said gas outlet opening a sufficient distance so that water gravitating from the inboard side of said liquid supply means can flow along said baffle to said top surface of said lower film fill section.

* * * * *